United States Patent [19]
Kakamu et al.

[11] Patent Number: 6,034,013
[45] Date of Patent: Mar. 7, 2000

[54] TOURMALINE COMPOSITE GRAINS AND APPARATUS USING THEM

[75] Inventors: Yoshinori Kakamu, Toki; Hikohiro Sano, Touzansha 2C, 4-9, 8-chome, Iwabaridai, Kasugai-shi, Aichi-ken, both of Japan

[73] Assignees: Mino Ganryo Kagaku Corporation, Gifu-ken; Hikohiro Sano, Aichi-ken, both of Japan

[21] Appl. No.: 09/066,578

[22] Filed: Apr. 27, 1998

[30] Foreign Application Priority Data

Mar. 12, 1998 [JP] Japan ................................ 10-061083
Mar. 12, 1998 [JP] Japan ................................ 10-061084

[51] Int. Cl.$^7$ .............................. C03C 10/00; C02F 1/30; C02F 1/46; C02F 1/48
[52] U.S. Cl. .............................................. 501/32; 501/153
[58] Field of Search ....................................... 501/32, 153

[56] References Cited

U.S. PATENT DOCUMENTS 5,770,089  6/1998  Kubo ........................................ 210/661

FOREIGN PATENT DOCUMENTS 3-118894A   5/1991   Japan .
9-110468    4/1997   Japan .
9-323087A  12/1997   Japan .

OTHER PUBLICATIONS

INPADOC citation 265896 for JP 9–110468, Apr. 28, 1997.

*Primary Examiner*—C. Melissa Koslow
*Attorney, Agent, or Firm*—Birch, Stewart, Kolasch & Birch, LLP

[57] ABSTRACT

Tourmaline fine powders are mixed with glass powders having melting point between 500° C. and the transition temperature of tourmaline, and the grains are formed from the mixture and sintered at a temperature below melting point of the glass. Tourmaline powders are stacked in the glass matrix in the tourmaline composite grains prepared above. When water passes through a case including many such grains, the water contacts with the grains and is converted to activated water by the grains. By using the activated water, a structure such as a moving vehicle or an outer wall of a building can be washed efficiently without a detergent. Further, the grains can be used in an apparatus for recycling wash water.

6 Claims, 17 Drawing Sheets

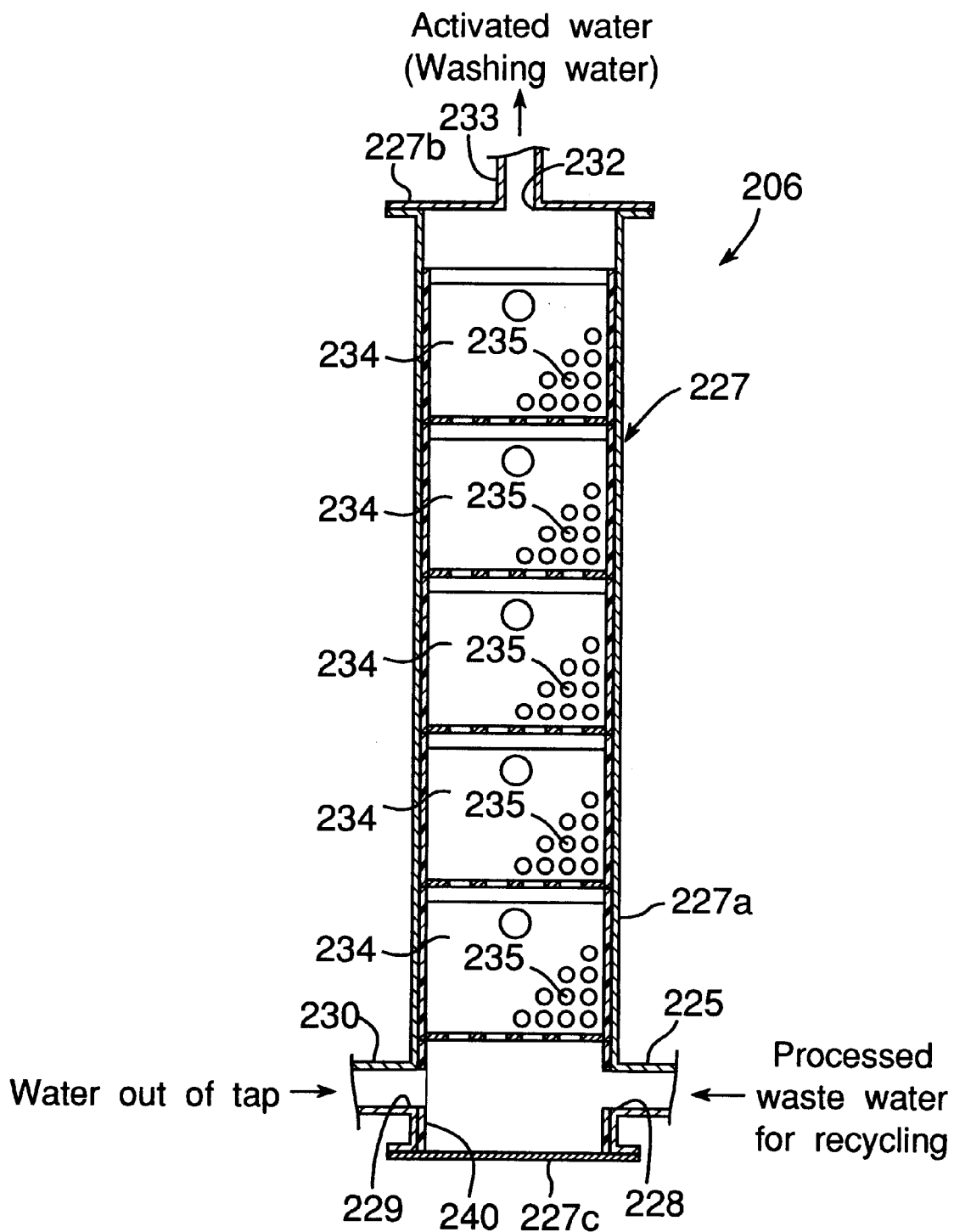

TOURMALINE COMPOSITE GRAINS AND APPARATUS USING THEM

BACKGROUND OF THE INVENTION

1. Field of the Invention

The present invention relates to composite grains of tourmaline, a production method thereof, and an apparatus using the tourmaline composite grains for example to supply wash water.

2. Description of Prior Art

Tourmaline is a mineral represented with a chemical formula, $NaX_3Al_6(BO_3)_3Si_6O_{18}(OH)_4$. It is divided into iron tourmaline (X=Fe), lithia tourmaline (X=Li+Al) and magnesia tourmaline (X=Mg), and mixed crystals thereof are generated. Usually tourmaline including iron tourmaline as a main component is available most. In the crystal structure, ions of Na, Li, Al, Fe etc. are arranged in a network structure of $Al_2O_3$—$B_2O_3$—$SiO_2$. As to electric properties of tourmaline, piezoelectricity and pyroelectricity were found in 1980, and it is known to have permanent electric poles. These properties vanish at about 1,000° C. Tourmaline is an infrared rays radiator, and the wavelength of infrared radiations is equal to or larger than 10 μm at room temperature.

Tourmaline is used for example to remove electrostatic charges by mixing it into synthetic fibers, using electrical properties thereof and to subject water itself to surface activation in water processing. Other various uses have also been proposed.

A tourmaline particulate as described in Japanese Patent laid open Publication 3-118894/1991 comprises tourmaline fine powders and a binder (or highly electrically insulating ceramics), where the tourmaline fine powders are embedded in the ceramics. The amount of the tourmaline fine powders in the particulates is about 5–10% of the entire amount, in order to maximize the number of tourmaline electric poles existing on the surface of the particulates while not canceling the opposite charges by contact to each other. However, such prior art tourmaline particulates, for example, do not have a satisfactory degree of surface activation effect. Therefore, it is desirable to solve various problems in order to use tourmaline in various uses effectively.

In general, a structure such as an automobile, a railroad train, an airplane or an outer wall of a building exposed to an outdoor environment is washed to remove dirt due to adherence of dust, oil or mud. When such a structure is washed, a detergent or a drug is used to improve washing performance. For example, an automobile is washed to remove dirt adhered on the body thereof, and it is waxed thereafter to improve its luster and to suppress adhesion of dust or the like.

When washing with a detergent or a drug is repeated, however, the surface of the structure is changed in quality or deteriorated by the detergent. For example, the coating on the body of an automobile is deteriorate and loses its luster. Further, because a large amount of detergent is used in the washing of large structures, the water quality in a river, a lake, a pond or an inland sea becomes worse if the detergent is not processed sufficiently in sewage systems and the like. It is also a problem that water resources are used wastefully, especially in the times of water shortage.

Further, underground water or well water is often used in the washing of such structures because of the low cost. In such a case, it is a problem that green moss grows on the surface of the structures. Therefore, it is desirable that structures are washed effectively while keeping luster of the surface thereof.

SUMMARY OF THE INVENTION

An object of the invention is to provide a material including tourmaline having better properties and a production method thereof.

An object of the invention is to provide a water supplier by using a material including tourmaline.

In one aspect of the invention, tourmaline composite grains according to the invention comprise a glass matrix, and powders of tourmaline are dispersed therein of weight ratio which is equal to or larger than 30%. Because such a very large amount of tourmaline powders are dispersed in the glass matrix, the tourmaline powders are in contact with each other. Then, there is a large probability that tourmaline powders are aligned in series. The lower limit of 30% denotes a limit where tourmaline powders are dispersed while being in contact in series in the matrix. Though the upper limit is not described, there exists a practical limit for having a sufficient strength with the glass matrix, for example about 70% in an embodiment which will be explained below.

In another aspect of the invention, a water supply apparatus for supplying wash water comprises a tank for storing raw water, a water supplier which supplies the raw water stored in said tank, and a tower containing the above-mentioned tourmaline composite grains. The tower receives the raw water supplied from the tank by the water supplier, and makes the raw water flowing therethrough to contact with the tourmaline composite grains. Thus, raw water is converted to activated water by contacting with the tourmaline composite grains, and the activated water can be supplied.

In a further aspect of the invention, an apparatus for recycling water comprises a tank for storing waste water after washing, and a tower which contains the above-mentioned tourmaline composite grains. The tower converts water received from the tank to activated water by contacting the water to the tourmaline composite grains and supplies the activated water for washing. Preferably, a preprocessor is provided between the tank and the tower for processing the waste water for improving the activation in the tank. A washing machine may be connected to the tank for washing an object physically with the activated water.

An advantage of the present invention is that the ionization of water is enhanced largely.

Another advantage of the present invention is that the washing performance of water is enhanced largely.

A further advantage of the present invention is that water can be recycled efficiently.

A still further advantage of the present invention is that a structure such as an automobile can be washed with a physical means without a detergent.

BRIEF DESCRIPTION OF THE DRAWINGS

These and other objects and features of the present invention will become clear from the following description taken in conjunction with the preferred embodiments thereof with reference to the accompanying drawings, and in which:

FIG. 19 is a sectional front view of a tower for activating water in the apparatus for washing a motor vehicle.

DETAILED DESCRIPTION OF THE PREFERRED EMBODIMENTS

Figure 1:
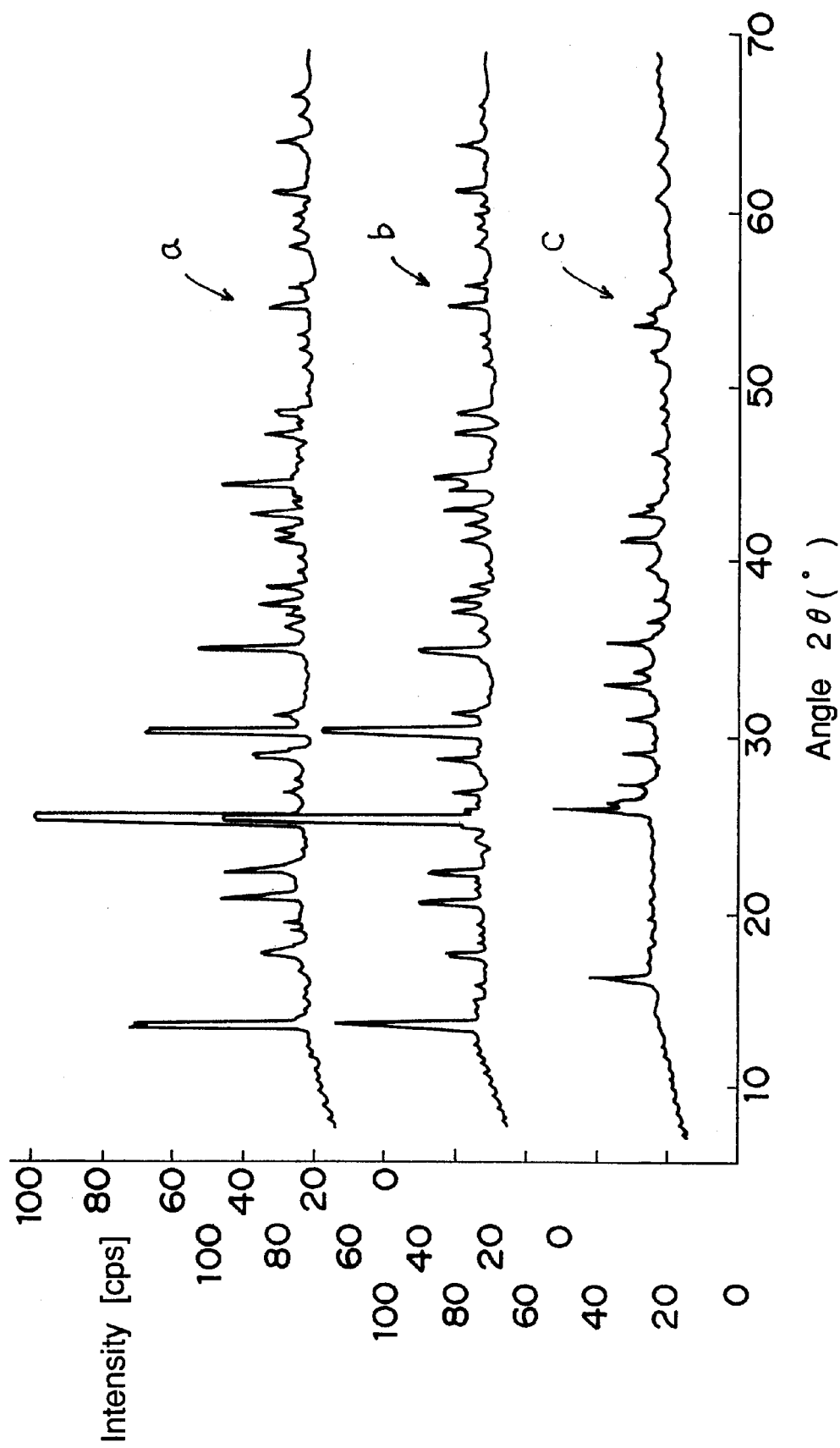
FIG. 1 is an X-ray diffraction chart of tourmaline powders of the (a) sample not sintered, (b) sample sintered at 800° C. and (c) sample sintered at 1,000° C.

Referring now to the drawings, wherein like referenced characters designate like or corresponding parts throughout the views, first, tourmaline composite grains according to a first embodiment of the invention is explained. In this embodiment, by pulverizing selected tourmaline with a conventional industrial process, particles of tourmaline in a size range obtainable with the industrial process (tourmaline fine powders of median size of about 1.0 μm) are heated up to a temperature between 450 and 800° C. (in correspondence to the transition temperature of tourmaline) and is cooled thereafter.

In an example, selected tourmaline sand (0.5 mm) is pulverized to grains of median size of about 1.0 μm to prepare fine powders, and the fine powders are sintered in an electric furnace at 600, 700, 800, 900, 1000 and 1100° C. for four hours, and cooled gradually thereafter. The samples prepared at the different sintering temperatures as well as a comparison example of fine powders not sintered are measured with powder X-ray diffraction.

In an X-ray diffraction chart shown in FIG. 1, reference signs "a", "b" and "c" represent a sample not sintered, a sample sintered at 800° C. and a sample sintered at 1000° C.

respectively. The samples not sintered and sintered at temperatures at and below 800° C. (including the samples "a" and "b") show diffraction peaks due to the crystal structure of tourmaline, and this means tourmaline exists in the samples. Further, peaks due to different crystal structures are not recognized practically. Still further, the X-ray diffraction angles (2θ) and X-ray intensities are almost the same in these samples. On the contrary, samples sintered at and above 900° C. (including sample "c") do not show diffraction peaks (2θ) due to the crystal structure of tourmaline, or their intensities are low, and this means tourmaline is transformed to a different mineral. According to the results of X-ray diffraction explained above, it is found that there exists a temperature around 850° C. at which the crystal structure of tourmaline is destroyed or a temperature (transition temperature) at which tourmaline is transformed to a different material.

Further, in order to study performance of the tourmaline samples for ionizing water, oil decomposition is observed as follows. Powders of 15 mg of the sample not sintered, and the samples sintered at 600, 700, 900 and 1000° C. are put in polyethylene beakers of 230 ml, respectively. Further, 200 ml of water and 2 ml of cooking oil are added to each of the beakers. They are stirred for two minutes twice a day. The degree of oil decomposition is observed for six months. The oil is decomposed in the order from emulsifying to a rubber-like viscous state to a low viscosity state and a gruel state. It is found that the degree of oil decomposition (decomposition speed) is large in the order of the sample sintered at 600 or 800° C., the sample not sintered, the sample sintered at 900° C. and the sample sintered at 1000° C. Therefore, there is a difference also in the degree of oil decomposition between above and below the transition temperature of tourmaline.

In the crystal structure of tourmaline, ions of Na, Li, Al, Fe etc. are arranged in a network structure of $Al_2O_3$—$B_2O_3$—$SiO_2$. By heating, positive charge at one end of a crystal and negative charge at the other end thereof are increased due to exchange of ionic valence ($Fe^{2+} \rightarrow Fe^{3+}$), new displacement of atomic positions or the like, and this results in a cell of higher electric potential. It is considered that if the heating temperature exceeds 900° C., the crystal structure of tourmaline is destroyed and the electric potential due to the displacement vanishes. Even if tourmaline is used as a raw material, electric properties of tourmaline are not used. Further, after strong drying (heating at or below 400° C.), energy thereof is small, and no new displacement arises in raw tourmaline. Therefore, heating operation from 450° C. to transition temperature (850° C.) is needed for increasing electric potential in each tourmaline grain. Especially, sintering at temperature in a range between 600 and 800° C. is preferable.

It is said that tourmaline has permanent electric poles from the onset of its formation. In one theory, when tourmaline is created due to metamorphism, the crystal structure is distorted from the stable state due to rapid cooling to generate positive and negative electric poles at the two ends of a crystal. However, tourmaline is created mainly at the last stage of pegmatite, and large crystals are formed due to gradual cooling. Though the electric poles are created due to the distortion of the crystal lattice, it is considered that the magnitude of the strain scatters among them. Then, one of the methods for enhancing the charges of the poles or electric potential in tourmaline is to cause a large movement or shift in tourmaline crystals having piezoelectricity and pyroelectricity by adding a large energy, within a range where the crystal structure is not destroyed. As a means for the movement or shift, the following are considered to be used: Valence change of $Fe^{2+}$ or the like included in tourmaline due to pulverizing, mechanical thermal energy or heating, change in ionic radius according to valence change, and physical energy of expansion or contraction due to heating or cooling. In this embodiment, heating is used to improve the properties of tourmaline fine powders not sintered, to provide tourmaline composite grains which have superior ionization performance for water.

Figure 2:
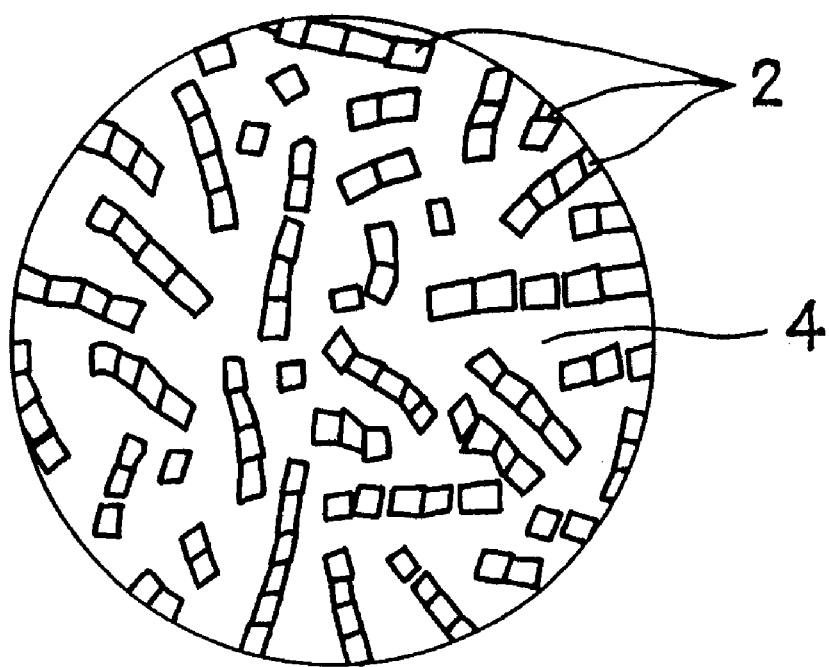
FIG. 2 is a schematic diagram of arrangement of tourmaline fine powders in a composite grain.

Next, tourmaline composite grains are explained. FIG. 2 shows schematically a series arrangement of tourmaline fine powders 2 in the glass matrix 4. A tourmaline composite grain consists of a large amount (equal to or larger than 30%) of tourmaline fine powders 2 and a glass matrix (binder) 4. In such a grain, the tourmaline fine particles 2 exist not only on the surface of the grain, but are connected in series inside the grain, and this enhances the electric potential therein. In order to produce a tourmaline sintered material of this structure, tourmaline is pulverized to provide tourmaline fine powders, and they are mixed with glass powders having melting point between 500° C. and the transition temperature of tourmaline. Then, the composite mixture is formed into grains, and the grains are sintered at a temperature lower than the melting point of the glass.

As explained above, the glass matrix is made of glass powders having a melting point between 500° C. and the upper transition point of tourmaline. Concretely, the glass matrix is sintered at a temperature below the melting point of the glass powders. At the sintering, the tourmaline powders are also sintered at the same time at a temperature between 450° C. and the upper transition temperature, and this improves the properties of tourmaline in the matrix. The upper limit of the temperature is set so as to prevent the crystal structure of tourmaline to be destroyed which makes the desired properties of tourmaline lost. The temperature of lower limit of 450° C. is the lowest limit at which the sintering effect is expected in a conventional furnace. The sintering improves washing performance or the like of the tourmaline composite grains.

Concretely, in order to prevent adhesion due to melting, the sintering temperature is set to a temperature lower than the melting point by 50° C. or more. The obtained tourmaline composite grains are sintered materials, and they are preferable for uses such as washing which require porosity. Further, the sintering of the glass serves also as the sintering of tourmaline between 450° C. and the transition temperature of tourmaline (preferably between 600 and 800° C.), and as already explained above, the sintering improves the properties of the tourmaline fine powders.

When the tourmaline composite grains are produced, tourmaline sands are pulverized to provide fine powders thereof, the tourmaline fine powders are mixed with glass powders having melting point between 500° C. and the transition temperature of tourmaline, and the mixture is formed into grains. Then, the grains are sintered at a temperature below the melting point of the glass powders (preferably between 450 and 800° C.). The sintering is performed at a temperature below the melting point of the glass powders in order to improve work efficiency by preventing adhesion of the tourmaline composite grains. Porousness due to sintering is advantageous for washing. Details will be explained later.

Each of the tourmaline fine powders is an electric cell having plus and minus electric poles (+−). However, as the amount of tourmaline fine powders is increased, there appear many series connection such as (+−)(+−)(+−) . . . of the plus and minus poles of tourmaline inside a sintered grain and on the surface thereof. Thus, the probability that the electric potential is increased becomes larger. At the same time, it is inevitable that parallel distribution and reverse connection such as (+−) (−+) are increased in proportion to the amount of tourmaline. It is said that the potential difference of one tourmaline is 2–10 eV. The electric potential of a commercial cell is 1.5 V, and the electrical decomposition voltage of water is 1.0 V (1 V≈$10^{19}$ eV). In order to increase the electric potential of the sintered grain as close as possible to the above value, it be necessary that (1) the tourmaline is pulverized as finely as possible, to provide the largest magnitude of electric potential for a asingle cell, and (2) as much of the tourmaline be collected as possible. In this embodiment, tourmaline fine powders 2 of median size of about 1.0 μm which can be pulverized with a conventional industrial process, and the particles 2 are connected as much as possible in the sintered grains to increase the entire electric potential. As shown schematically in FIG. 2, a minus pole at the bottom of a particle 2 contacts with a plus pole at the top of a next particle 2, and a minus pole at the bottom of the particle 2 contacts with a plus pole at the top of a further particle 2, and so on. Thus, many tourmaline fine powders 2 are connected in series. Though there are isolated powders and electrically neutralized ones, the grains are produced to increase connections so as to enhance the entire electric potential. Thus, it is necessary to distribute the tourmaline powders homogeneously in the binder 4, and it is preferable to form grains by using water-containing material pulverized and mixed with a wet process.

A glass powder of low melting point (of dielectric constant of about 4–8) is adopted as the binder for sintering. This binder has melting point of 500–850° C., similar to the heat treatment temperature range of the tourmaline fine powders 2 explained above this binder also has similar composition to tourmaline. That is, the binder can perform the heating for generating electric potential of tourmaline, and the collection and fixing of tourmaline fine powders at the same temperature simultaneously. The binder is fine powder having a composition similar to tourmaline ($SiO_2$, $B_2O_3$, $Al_2O_3$, MgO, ZnO etc.) and having been transformed to glass already. The thermal conduction and the expansion coefficient thereof are about the same as those of tourmaline, and the shift in the tourmaline crystals is generated smoothly. The glass powders can sinter a large amount of tourmaline powders (between about 30% and 70%) at a temperature near the melting point. The upper limit of the tourmaline component is a value at which the fixing with the binder is possible, and the strength of fixing is maintained to about 70%. The lower limit of 30% is a value to which advantages of the invention are confirmed and the tourmaline fine powders are arranged in series. It is considered that the grains can be used practically even if the amount is less than 30%.

Next, the method for producing the composite grains of tourmaline is explained. The tourmaline sand and the low melting point glass powders of weight ratio between 3:7 and 7:3 are added with a small amount of surface activation agent and a solid substance, and an equal amount of water. These consituents and mixed in a tronmel sufficiently. The obtained slurry is filtered. Then, the obtained water-containing material is formed into grains of desired shape with a forming machine, a granulating machine or the like, and the grains are dried. Next, the grains are sintered and hardened at a temperature near the melting point of the glass powders.

The production proceeds in detail as will be explained below. First, 50 kg of tourmaline sands obtained by pulverizing selected tourmaline to median size of about 1.0 μm are put in a 100 kg tronmel with 50 liters of water and pulverized for 24 hours. Next, 50 kg of the low melting point glass powders (for example, $SiO_2$ of 1.4 mol, $B_2O_3$ of 1.0 mol, $Al_2O_3$ of 0.2 mol, MgO, CaO, $Na_2O$ of 0.75 mol, melting point of 750° C.) which have been prepared are added thereto, and water is added further. Then, the pulverizing is continued further for 24 hours. The water-containing material taken out and filtered is formed as bars of φ 9 mm and length of 1000 mm with a push former. Pieces of length of 9 mm obtained by cutting it are subjected to processing with a machine for granulation, and they are dried. Next, they are put in a sheath and sintered at 700° C. to produce grains of φ 7 mm.

Figure 3:
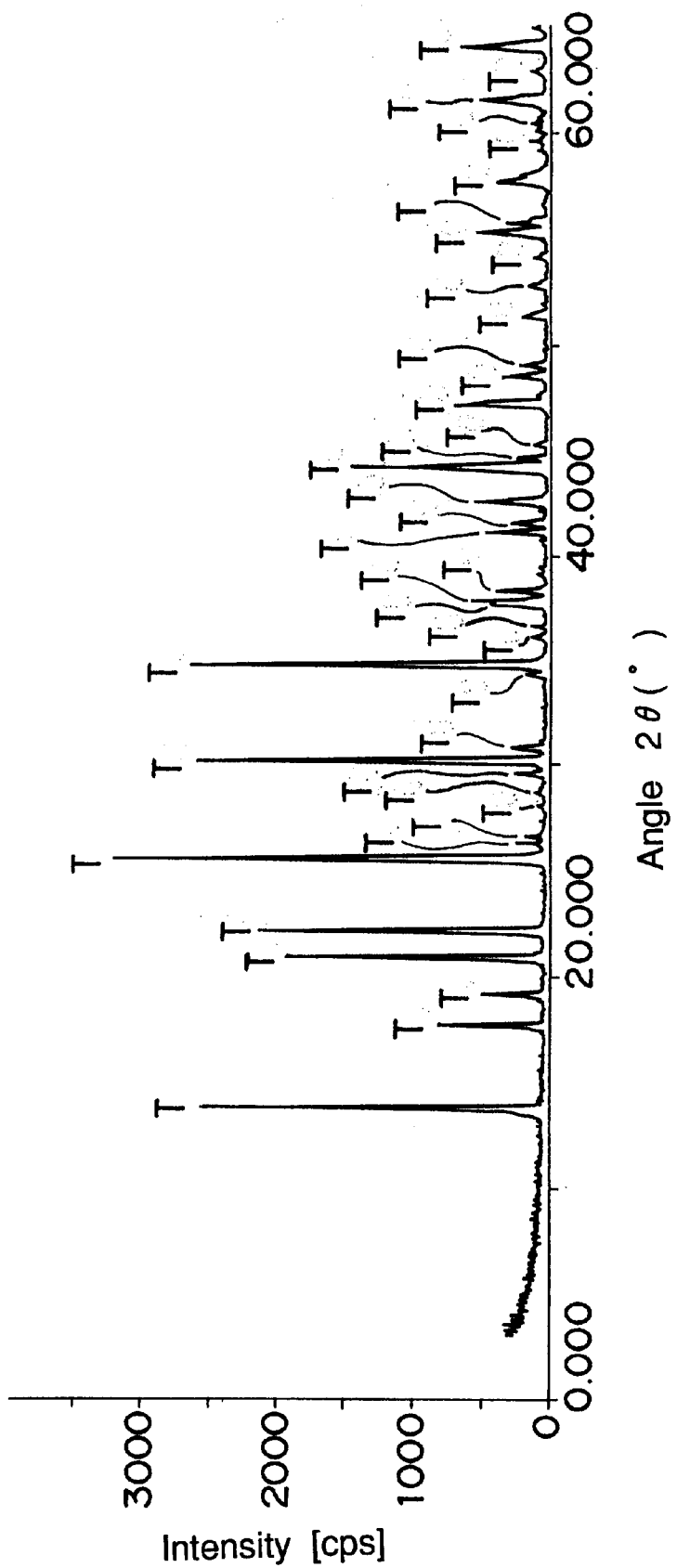
FIG. 3 is an X-ray diffraction chart of tourmaline composite grains (tourmaline: glass=7:3)
Figure 4:
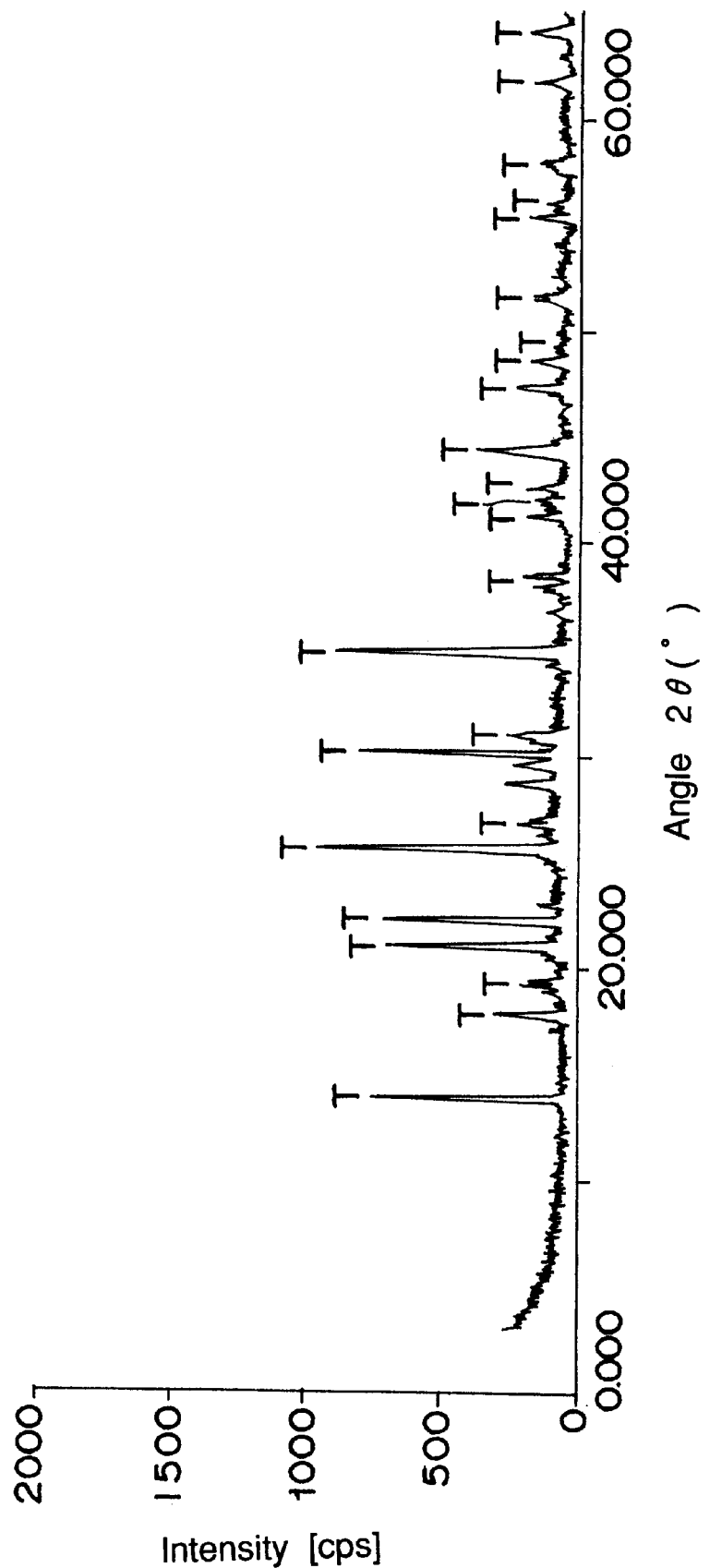
FIG. 4 is an X-ray diffraction chart of tourmaline composite grains (tourmaline: glass=7:3)
Figure 5:
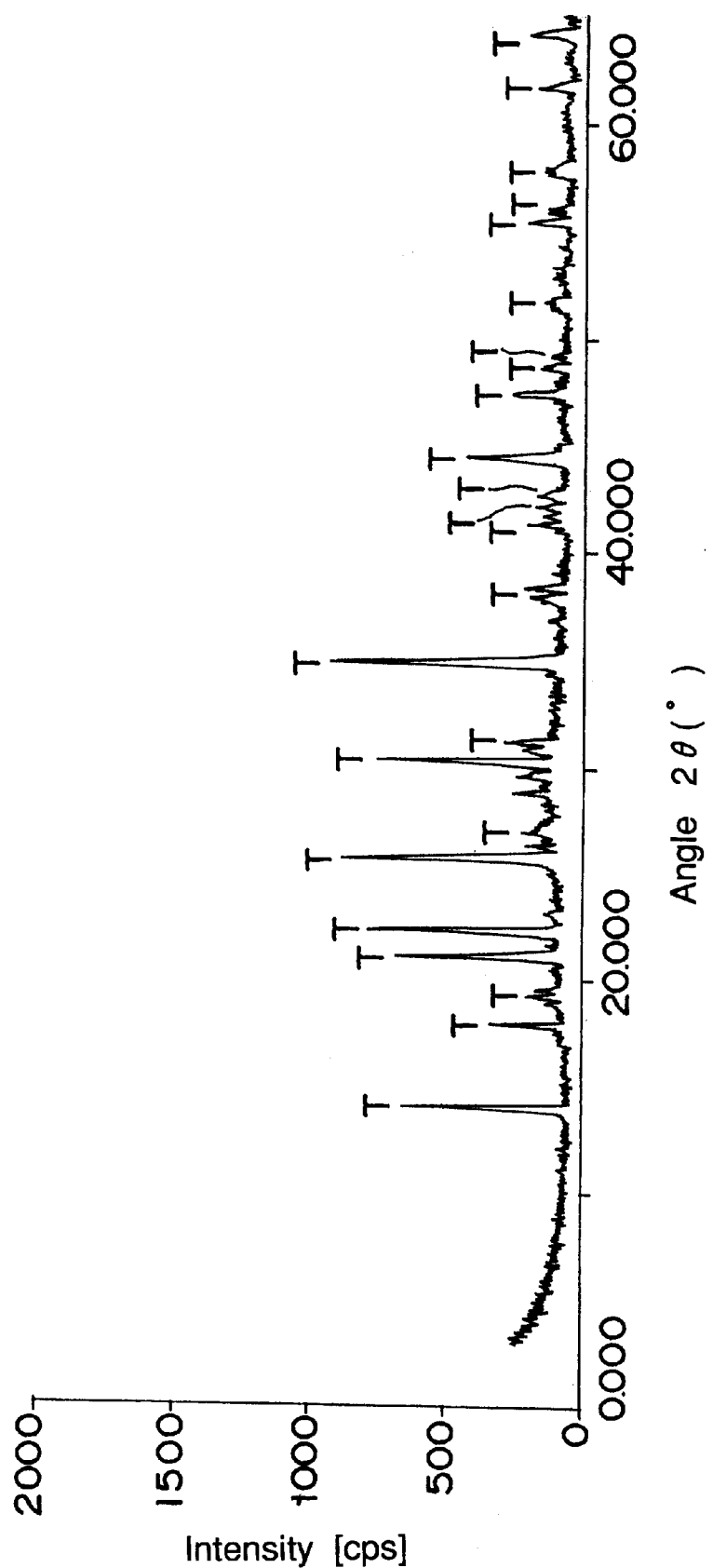
FIG. 5 is an X-ray diffraction chart of tourmaline composite grains (tourmaline: glass=5:5)
Figure 6:
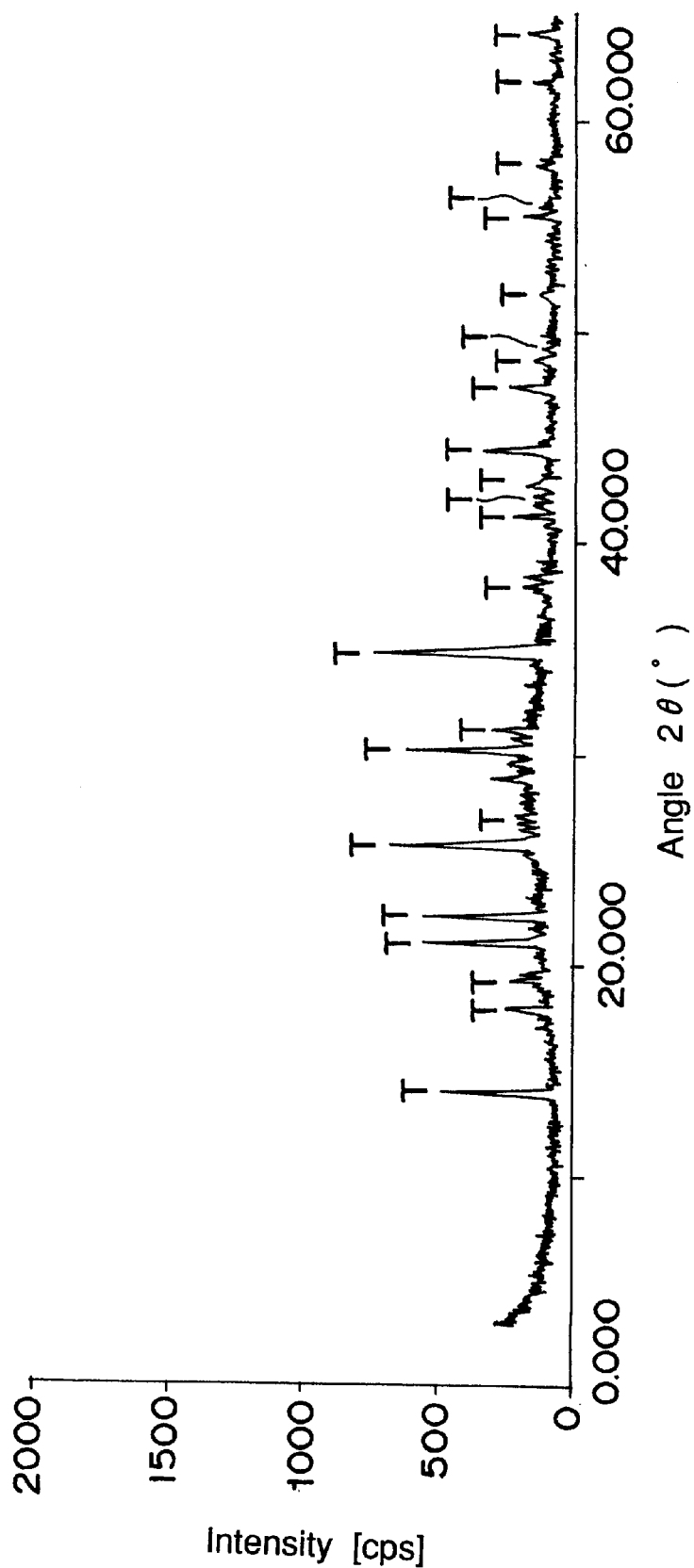
FIG. 6 is an X-ray diffraction chart of tourmaline composite grains (tourmaline: glass=3:7)
Figure 7:
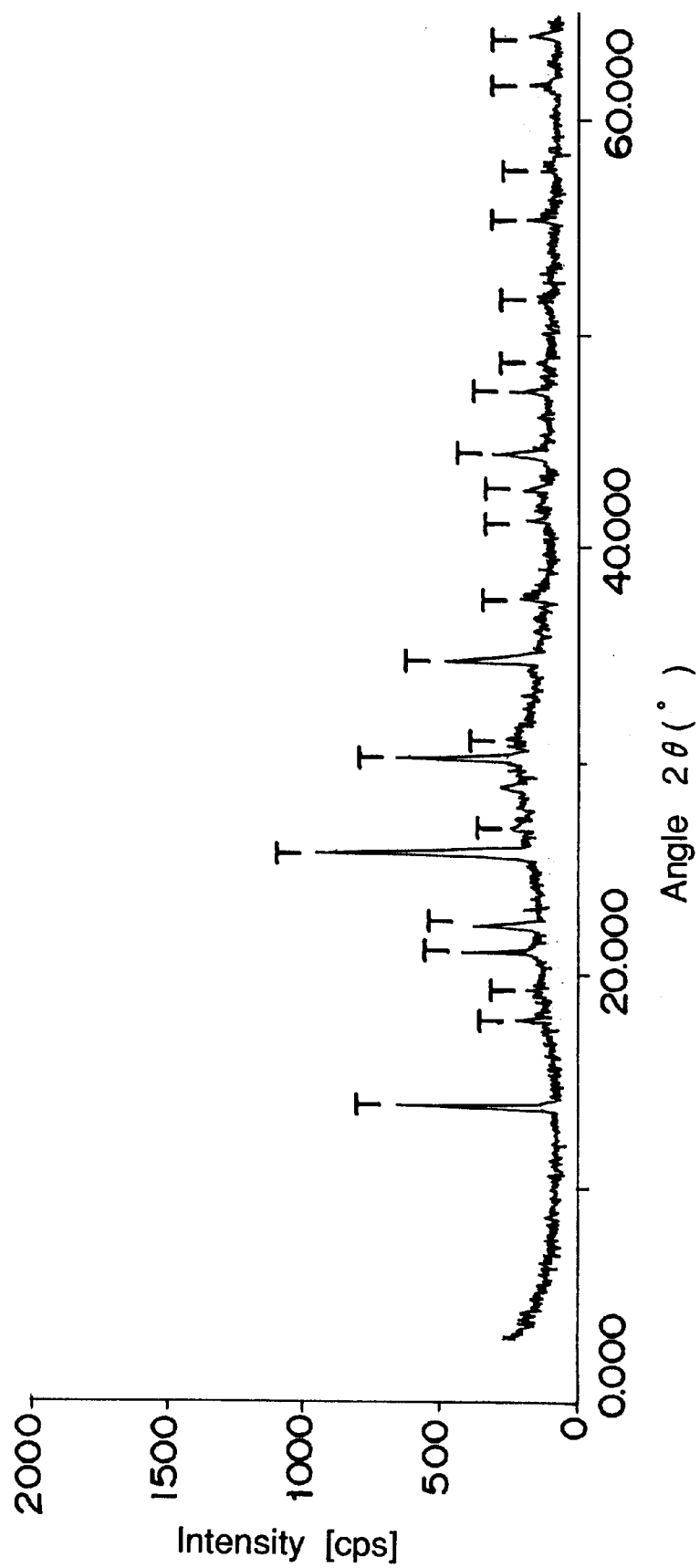
FIG. 7 is an X-ray diffraction chart of tourmaline composite grains (tourmaline: glass=2:8)
Figure 8:
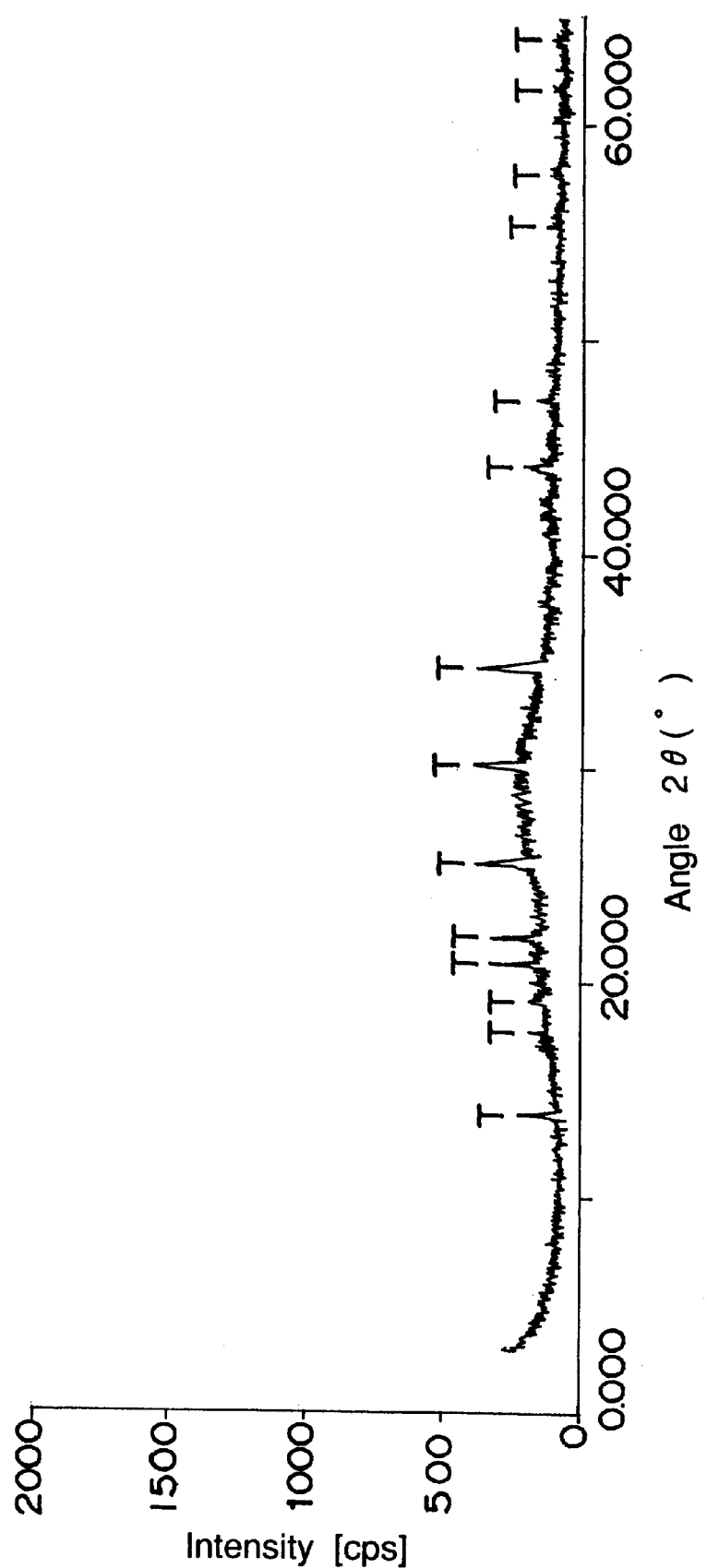
FIG. 8 is an X-ray diffraction chart of tourmaline composite grains (tourmaline: glass=1:9)

FIG. 3 is a powder X-ray diffraction chart of a tourmaline composite grain (tourmaline: glass=7:3) produced as explained above wherein the abscissa 2θ is the X ray diffraction angle. In FIG. 3, diffraction peaks denoted with "T" are ascribed to tourmaline, and this means that tourmaline exists and has not deteriorated. It is to be noted that diffraction lines of the matrix 4 do not appear because the matrix is a glass.

Next, in order to study the capacity of the granular sintered material for ionizing water, the capacity of the oil decomposition is observed. The sample grains used for observation have three kinds of weight ratio of tourmaline to glass of 3:7, 5:5 and 7:3, prepared as explained above. By putting 15 g of the sample grains in a 200 ml polyethylene container and adding 200 ml of water and 2 ml of cooking oil thereto, the degree of oil decomposition is observed for two months by stirring for two minutes twice a day. According to the results, the decomposition process of emulsifying→rubber-like viscous state→low viscous state→gruel state proceeds efficiently in the order of weight ratio of 7:3>5:5>3:7, as the resistance on stirring decreases and turbidity increases. This means that oil decomposition proceeds faster as the amount of tourmaline increases.

When tourmaline contacts with water, the reaction mechanism is considered as follows: The electric potential of tourmaline makes water ionized as follows:

$$2H_2O = H_3O^+ + OH^-.$$

As the electric potential increases, the number of ions is increased. The hydronium ions $H_3O^+$ lose charges when they contact with a metal or a resin container, and $OH^-$ (or hydroxim ions $H_3O_2^-$) concentration is increased in water. The tourmaline composite grains enhance ionization besides the ionization of water, and this increases $H_3O^+$ and $OH^-$ concentrations, decomposes and reacts cations $H_3O^+$ to enhance $OH^-$ concentration. Thus, the capability of washing is increased, and this can be used in industries for water washing of an object such as a mechanical part.

For example, if the container is made of a metallic iron or an iron alloy (such as stainless steel), the oxidation proceeds as follows:

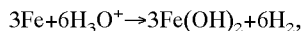
$3Fe + 6H_3O^+ \rightarrow 3Fe(OH)_2 + 6H_2$,

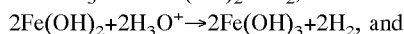
$2Fe(OH)_2 + 2H_3O^+ \rightarrow 2Fe(OH)_3 + 2H_2$, and

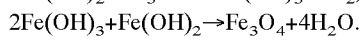
$2Fe(OH)_3 + Fe(OH)_2 \rightarrow Fe_3O_4 + 4H_2O$.

To sum up, the following reaction occurs:

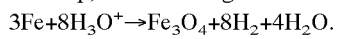
$3Fe + 8H_3O^+ \rightarrow Fe_3O_4 + 8H_2 + 4H_2O$.

That is, Fe is oxidized with $H_3O^+$ to $Fe^{2+}$, and converted further to $Fe(OH)_2$ with $OH^-$ ($H_3O \rightarrow OR^- + H_2$). A part of $Fe(OH)_2$ is oxidized further with $H_3O^+$ to $Fe(OH)_3$. The resultant $Fe(OH)_3$ reacts with the remainder of $Fe(OH)_2$ to $Fe_3O_4$ in a passive state. Then, $H_2$ and $OH^-$ concentrations are increased in water (in correspondence to consumed $H_3O^+$). If $O_2$ dissolves in water, $H_2$ consumes it to $H_2O$, to prevent oxidation of iron. These actions passivate the inside of a metallic container and a pipe with $H_3O^+$ ions, and suppresses the format of red mud by the consumption of the dissolves $O_2$ in water with resultant $H_2$. The latter is useful for water in a cooling tower for preventing red mud inside pipes.

If water flowing in a resin container or a resin pipe contacts with the resin surface, friction charges (negative charges) are given to the surface. They are neutralized with $H_3O^+$ charges in water, so that $OH^-$ concentration is increased in water. The washing capability of soap, a salt of a weak acid and a strong base, is caused by hydrolysis of soap to generate $OH^{- \text{ and}}$ to produce an alkaline water. In the case of tourmaline, $OH^-$ concentration is increased similarly to perform similar action.

By using a similar production process, grains are produced in a wide range of ratios of tourmaline to glass, and powder X-ray diffraction is measured thereon. FIGS. 4–8 show powder X-ray diffraction charts of tourmaline composite grains produced with weight ratios of tourmaline to glass of 7:3, 5:5, 3:7, 2:8 and 1:9. Similarly to FIG. 3, the abscissa 2θ represent X-ray diffraction angle, and diffraction peaks denoted with "T" are ascribed to tourmaline. The existence of tourmaline is confirmed in the weight ratio range between 3:7 and 7:3 of tourmaline to glass, as explained above. No diffraction peak due to different crystal structures are observed. Diffraction peak due to tourmaline are also observed in samples outside the above range.

Figure 9:
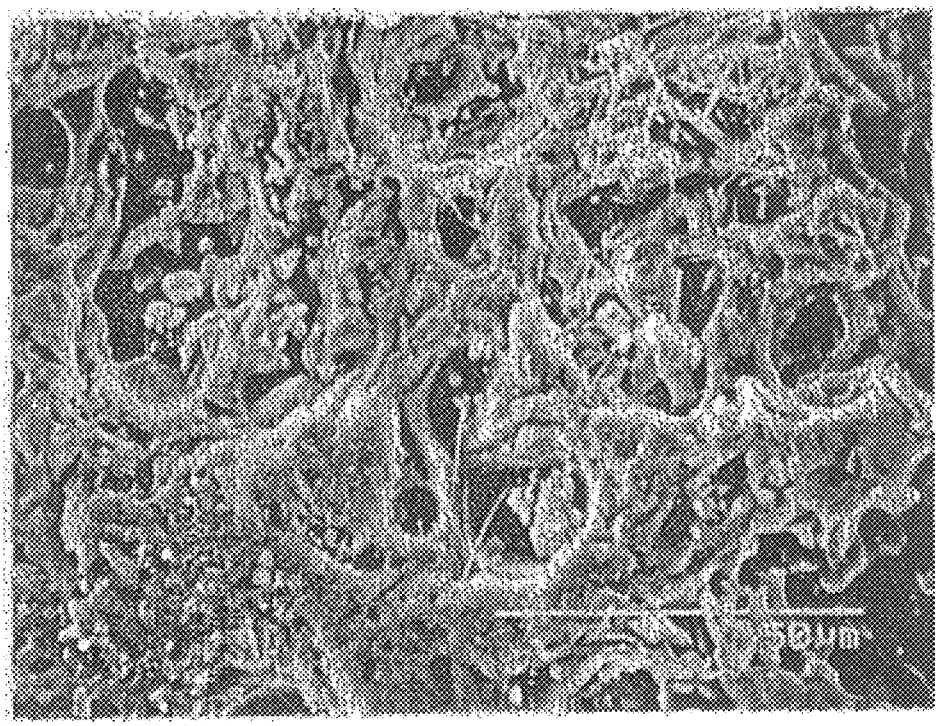
FIG. 9 is an electron microscope photograph of tourmaline composite grains (tourmaline: glass=7:3)
Figure 10:
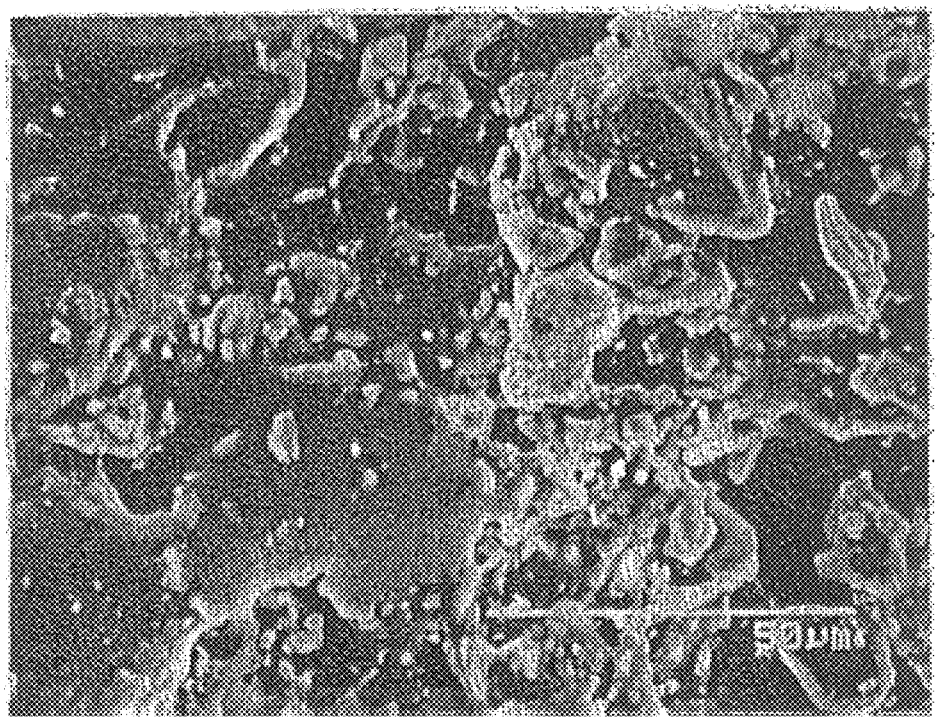
FIG. 10 is an electron microscope photograph of tourmaline composite grains (tourmaline: glass=3:7)
Figure 11:
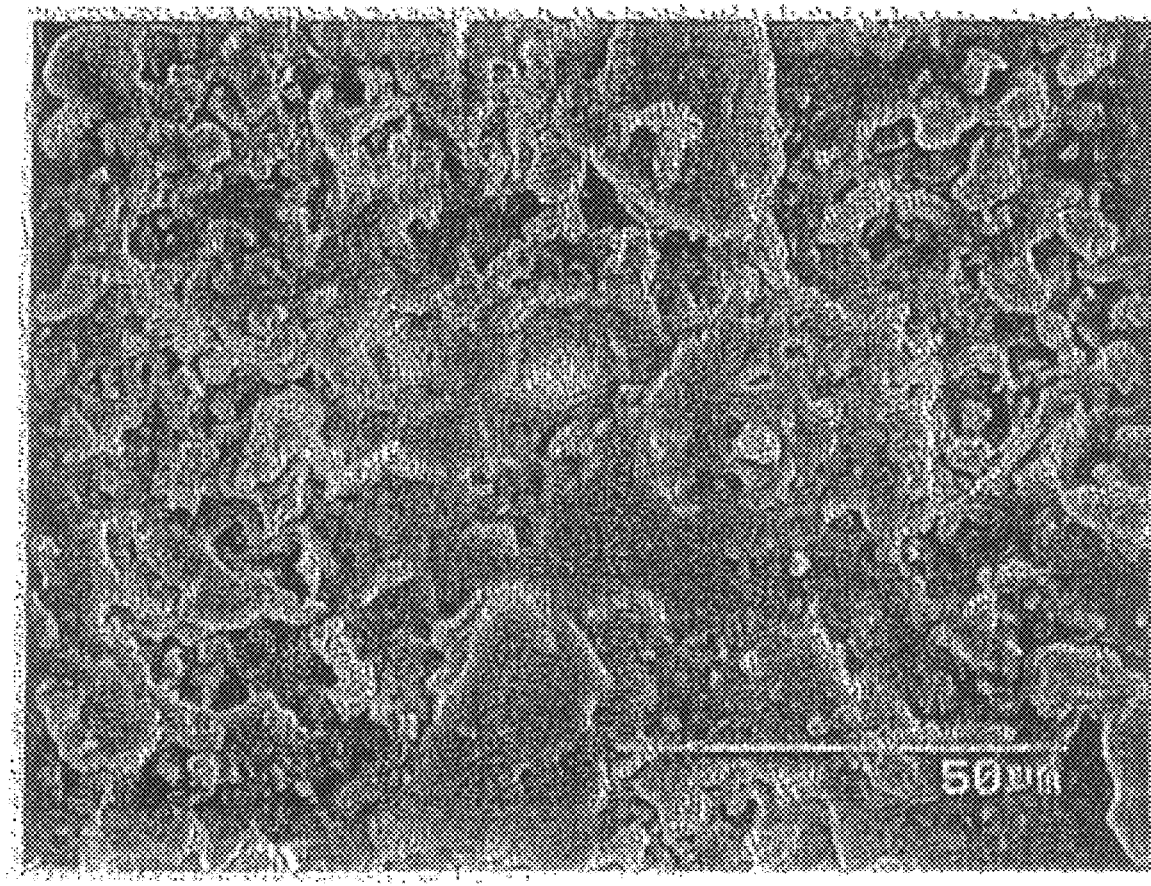
FIG. 11 is an electron microscope photograph of tourmaline composite grains (tourmaline: glass=1:9)

The colors of these samples is changed as the composition is changed. The surfaces of the samples are observed with an electron microscope. As representatives, FIGS. 9–11 show electron microscope photographs of tourmaline composite grains produced with ratio of tourmaline to glass of 7:3, 3:7, and 1:9 respectively wherein a white line for a scale of 50 μm is included. In these photographs, white portions correspond to tourmaline, while black portions correspond to glass. The grains are sintered materials, and they are all found to be porous.

Next, a difcfoerent embodiment of the invention is explained. Tourmaline is a far infrared radiator. In order to enhance the emissivity, glass having high far infrared emissivity is selected as the low melting point glass powder used for combining the tourmaline powders. Usually, it is sufficient to select as the binder glass powders having a skeleton of silicic acid-boric acid-alumina and added lime, magnesia and alkali. However, in order to enhance infrared emissivity, glass powders having a low melting point (550° C.) are prepared which include mainly silicic acid-boric acid-alumina and zinc and alkali. The compounding ratio is tourmaline powders:glass powders=1:1. The compounded material is formed into discs of φ 50 mm and thickness of 2 mm, and they are sintered at 700 and 500° C.

Figure 12:
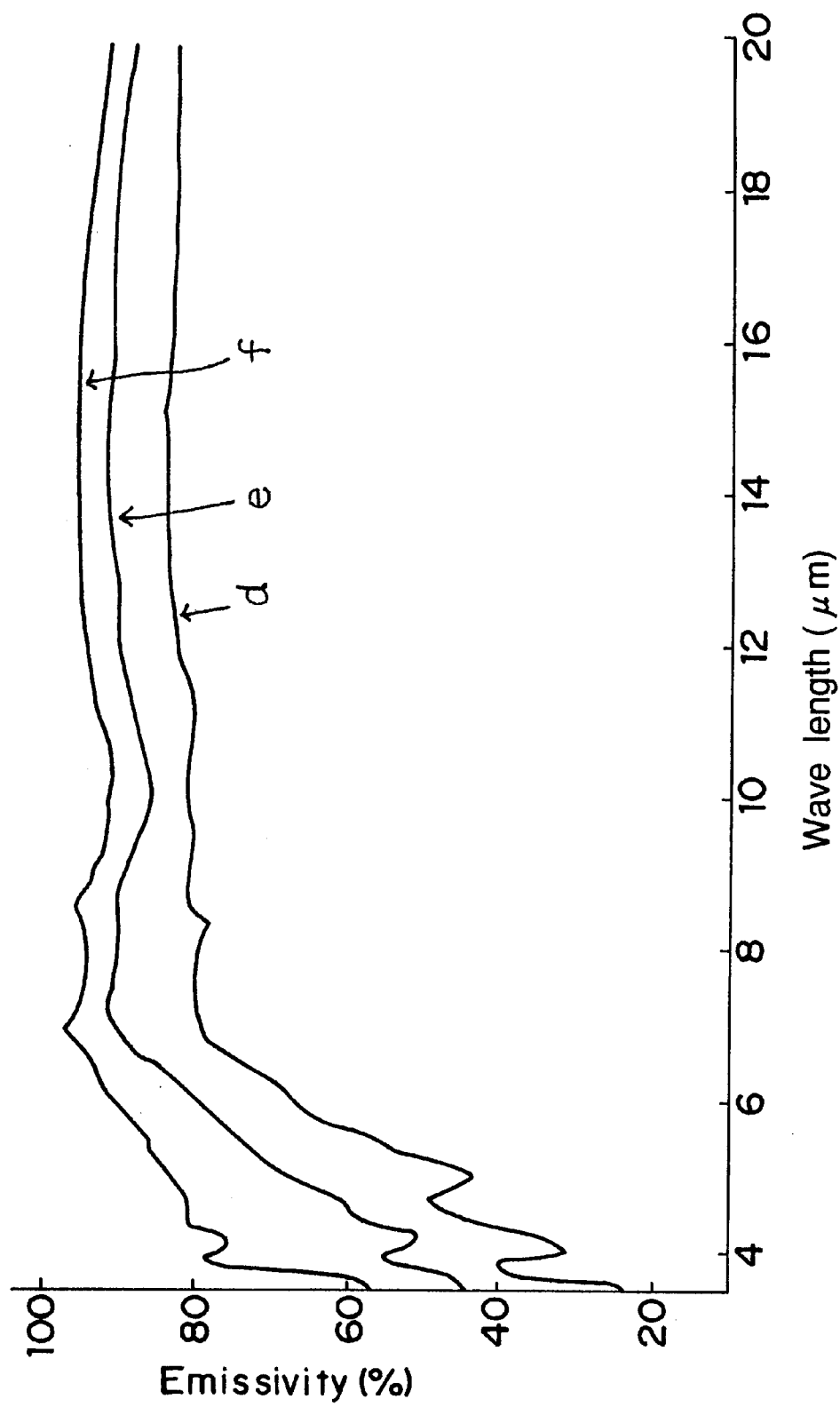
FIG. 12 a graph of far infrared emissivity of (d) a sample of tourmaline only, (e) a sample of tourmaline composite grains combined with a low melting point glass of the lime-magnesium-alkali system and (f) a sample of tourmaline composite grain combined with low melting point glass of zinc-alkali system.

Far infrared emissivity is measured on the prepared tourmaline composite discs. The measurement is performed on the above-discs at surface temperature of 140° C. with an apparatus having two black body furnaces of FT-1R (JIR-5300 of Nippon Densi). FIG. 12 shows far infrared emissivity of these samples, wherein (d) denotes a comparison sample of tourmaline only, (e) denotes a sample of tourmaline composite grain combined with the low melting point glass of lime, disc and alkali system and (f) denotes a sample of tourmaline composite disc combined with the low melting point glass of zinc-alkali system.

According to the data, far infrared emissivity at a wavelength of 8 μm (10.5 μm if converted at room temperature by adding 2.5 $\mu$) is about 80% for a black body for sample (d) of tourmaline only, 90% for sample (e) of tourmaline composite disc combined with the low melting point glass of lime, magnesia and alkali system and 99% for sample (g) of tourmaline composite disc combined with the low melting point glass of the zinc-alkali system. Further, far infrared emissivity at 4 $\mu$m (6–7 $\mu$m at room temperature) is 30%, 50% and 75% for the three samples.

Tourmaline is a far infrared radiator, while the low melting point glass is also a far infrared radiator having higher emission intensity. Then, the far infrared emissivity of tourmaline composite at room temperature is increased largely by combining tourmaline with the low melting point glass. The magnitude of far infrared radiations at room temperature is somewhat lower (80% at 10 $\mu$m for a black body), but it increases by 10–15% when combined with low melting point glass powders.

As explained above, in this embodiment, low melting point glass powders, having a similar composition and having a melting point below the temperature at which the crystal structure of tourmaline is destroyed, are mixed with as much pulverized tourmaline as possible, and are crushed as finely as possible in a wet pulverizing process. The obtained water-including material is formed and sintered at a temperature a little lower than the melting point of the glass powders. Thus, tourmaline composite grains can be produced which increase the electric potential and far infrared emissivity of natural tourmaline to a practical level.

Figure 13:
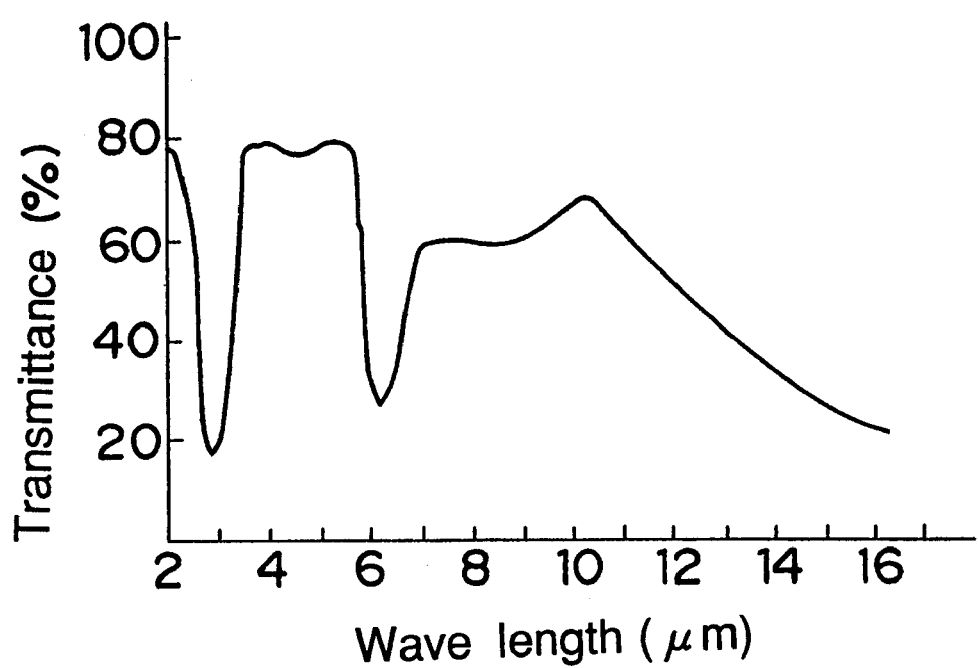
FIG. 13 is a graph of a spectral transmittance curve (far infrared absorbance curve)

Far infrared rays serve the function, by being absorbed in water clusters. If the radiation wavelength of far infrared rays agrees with the absorption wavelength of an object to be irradiated, molecules in the object absorb the radiations at that wavelenght causing stretching and deformation due to the resonance and the molucules are brought to a state where it becomes easier to react and to generate heat. An object to be radiated is usually water, and a cell contains about 70% of water. Thus, the absorption curve of water has been studied well. FIG. 13 shows a spectral transmittance curve (far infrared absorbance curve) of water. Water has absorption wavelengths at 3 $\mu$m, 6–7 $\mu$m and above 10 $\mu$m. On the other hand, a tourmaline composite has absorption wavelengths at 6–7 $\mu$m and above 10 $\mu$m. When a tourmaline composite is put in water, water absorbs wavelengths of 6–7 $\mu$m and above 10 $\mu$m to perform molecular motions actively. Usually water consists of clusters of 36–37 molecules, but those are divided into clusters of 7–8 molecules and the reactivity is increased by absorbing far infrared rays. It is said this is the largest advantage of far infrared rays to water. Further, as other advantages of cluster division, impurities included are sent out, solubility is increased, surface tension is decreased, vaporization is enhanced, and these effects can be used for various uses.

Therefore, when tourmaline composite grains of the embodiment are immersed in water, they produce as ionization effect including mainly water electrolysis due to the electric potential and an enhanced radiation effect of far infrared rays. The enhanced radiation effect of far infrared rays facilitates decomposition of organic substances by radiating directly to organic substances (oils and amines) of the living body dissolving in water, and helps soap function due to $OH^-$ ions produced by the ionization of water by tourmaline itself. Thus, in this embodiment, the weak electric potential of tourmaline is increased to a practical level to accelerate ionization of water and washing effect such as oil decomposition in water is enhanced due to the properties of far infrared rays. As explained above, besides the ionization, tourmaline functions to enhance reactivity by dividing water clusters due to far infrared rays, and the synergy thereof helps to activate water. Thus, without adopting the surface activation theory of $H_3O_2^-$, the washing effect of tourmaline can be explained. It is also a characteristic that the energy for the washing is due to the energy of tourmaline itself.

A circulation hot bath (24-hour hot bath) is one of the expected uses of tourmaline. It becomes popular in several years. Recently, a biological filter, an ultraviolet light or the like is built in a circulation path of hot water for recycling, sterilizing and removing waste. Thus, a person can use the hot bath always, and the frequency of water replacement is once in one to four weeks. In many circulation hot baths, crushed materials of hydrothermal metamorphism rocks or pegmatite minerals are pulverized or are set for passing hot water therethrough, as an assistant to filtration, or to add hot spring ingredients.

Table 1 shows a result of water quality tests for hot water (40° C.) used for half a month in a circulation hot bath (300 liters) for home use wherein 1 kg of tourmaline synthetic grains are filled in a part of circulation. Thus, even when hot water is used continuously for half a month, turbidity is kept low, and the amount of organic substances (OCD) is kept small. That is, there is no problem in the water for the bath.

TABLE 1

| | Water quality | | |
|---|---|---|---|
| Item | Water used for 1 day | Water used for 15 days (1) | Water used for 15 days (2) |
| Cl | 8.2 | 9.7 | 9.7 |
| Ca | 11 | 12 | 12 |
| Na | 11 | 13 | 14 |
| Fe | Not detected | Not detected | Not detected |
| 1) | 1.9 | 2.3 | 3.0 |
| turbidity | <1 degree | <1 degree | <1 degree |
| 2) | Not detected | Not detected | Not detected |
| pH | 7.29 | 7.17 | 7.13 |
| 3) | 154.3 (19.1° C.) | 186.4 (18.2° C.) | 187.9 (24° C.) |
| B | 0.027 | 0.98 | 0.88 |

NB: In Table 1, "1" denotes organic-substance (COD), "2" denotes number of coliform bacillus groups, and "3" denotes electrical conductivity.

When the tourmaline composite grains are filled for the above circulation hot bath, they function as an assistant for recycling the hot water due to the synergetic function of far infrared rays and ionization.

(1) Far infrared rays are radiated at the absorption wavelengths of 7–8 $\mu$m of dirt (proteins and substances decomposed from fatty acids) in hot water to facilitate decomposition.

(2) Dirt is decomposed due to $OH^-$ in water increased by the electrical potential of tourmaline.

Another characteristic of tourmaline when used in the circulation hot bath is that the blood flow is enhanced due to electrical stimulus to the skin of a person in the hot bath because the weak current in water adjacent to the tourmaline grains is about the same as the current in cells of the person. Thus, so-called chill after leaving a hot bath becomes hard to occur.

Figure 14:
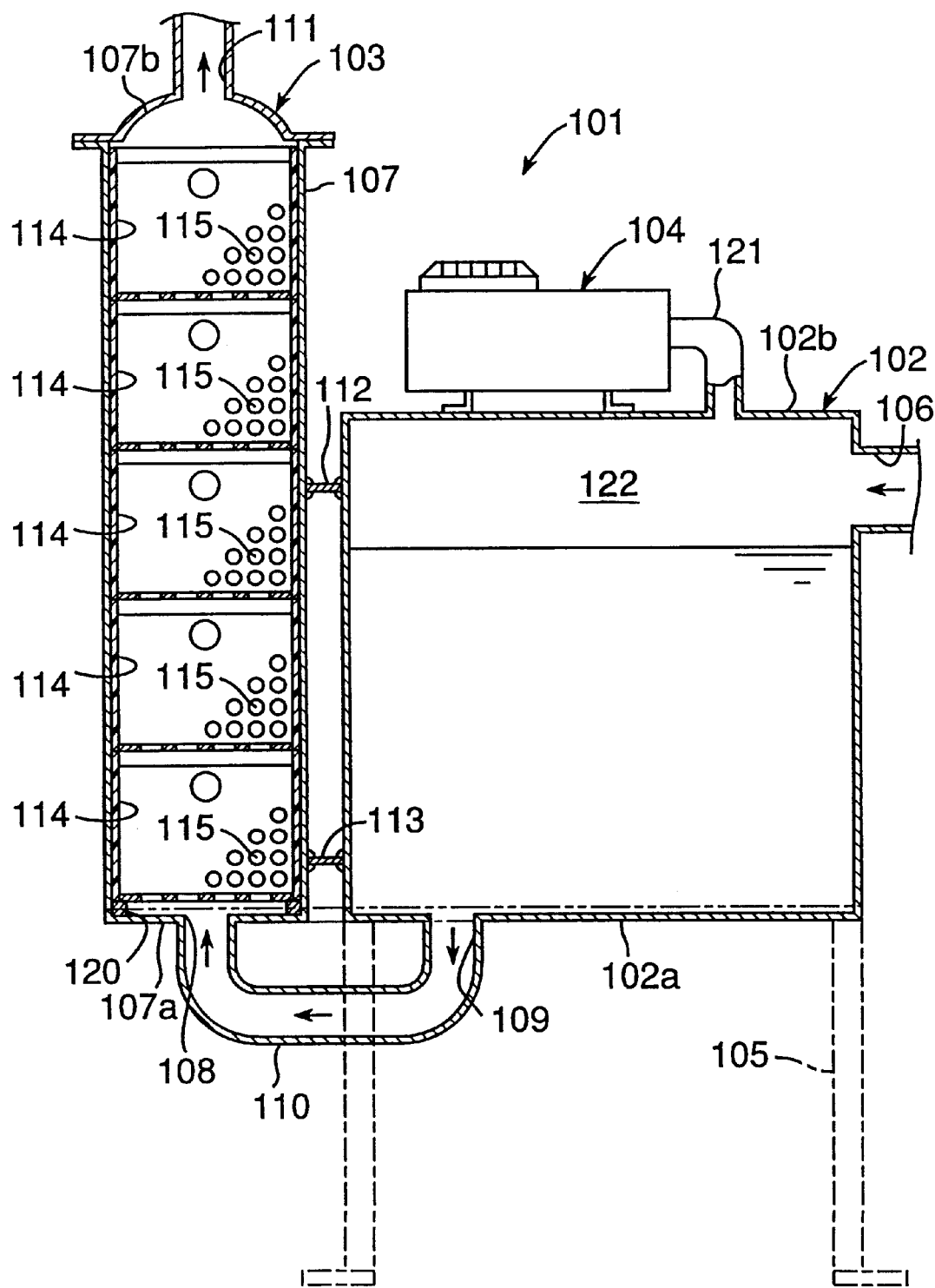
FIG. 14 is a sectional front view of an apparatus for supplying wash water.

Next, an embodiment of an apparatus 101 for supplying wash water is explained. As shown in FIG. 14, the apparatus 101 includes a raw water tank 102 for storing raw water, an activated water tower 103 for activating water (that is, for supplying water rich in $OH^-$ ions and relatively small clusters) by converting the raw water, and a pressure pump (or compressor) 104 for transferring the raw water in the tank 102 to the activated water tower 103. The tank 102 is made of steel plates and mounted on a base 105. Raw water is introduced through an inlet 106 into the tank 102. The inner face of the tank 102 is subjected to coating or lining with a resin or the like in order to improve corrosion inhibition. Raw water is for example tap water, underground water or well water. The material of the tank 102 is not limited to steel plates, and any material can be used as far as the strength is sufficient (for example, so as not to destroy the tank until the inner pressure in the tank is increased up to about 2 kg/cm$^2$).

The activated water tower 103 is also mounted to the base 105. The tower 103 has an outer tube 107 of hollow cylinder made of steel plates. An inlet 108 provided at the bottom end wall 107a of the outer tube 107 is connected through a supply tube 110 to an outlet 109 of the raw water tank 102 provided at the bottom 102a thereof. Further, an outlet 111 is provided at the top wall 107b of the tower 103 to supply activated water. The outer tube 107 is fixed with fixing members 112 and 113 to the raw water tank 102.

Inside the outer tube 107, five inner tubes 114 of hollow cylinders are stacked in multi-stages. Many tourmaline composite grains 115 having shapes of beads or balls are contained inside the inner tubes 114, as shown schematically in FIG. 14. The grains 115 are made of fine tourmaline powders combined with a binder of low melting point glass as explained above. As the glass, the low melting point glass powders including zinc explained above are used.

Figure 15:
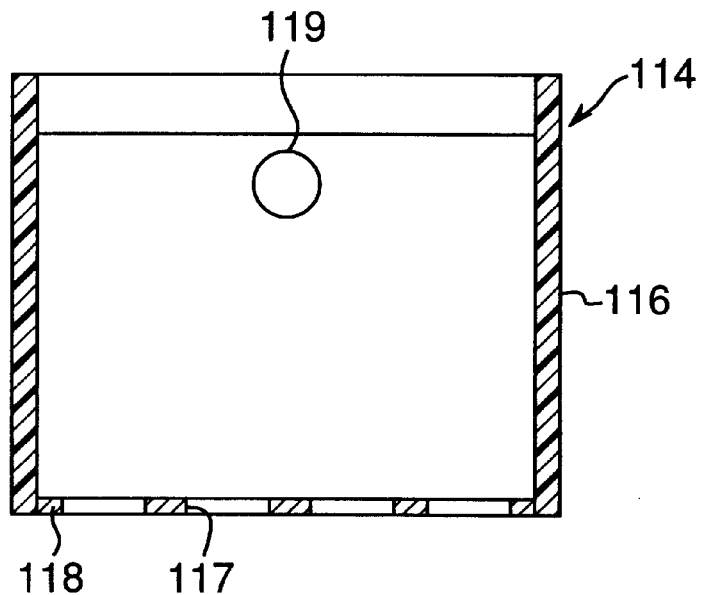
FIG. 15 is a sectional front view of an inner cylinder in the apparatus for supplying wash water.
Figure 16:
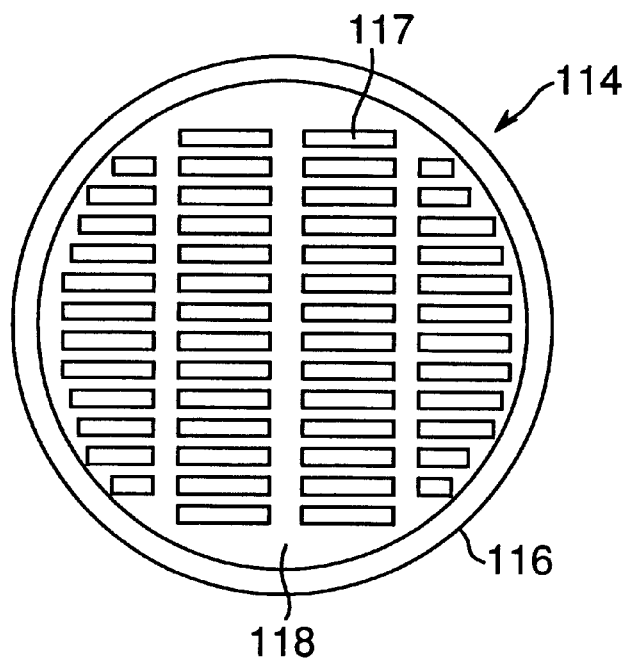
FIG. 16 is a plan view of the inner cylinder.

As shown in FIGS. 15 and 16, the inner tube 114 is made of a tube part 116 made of a plastic material and having a form of a hollow cylinder, and a base plate 118 made of punching metal, fixed to the bottom of the tube part 116 and having many openings 117. Each opening 117 is rectangular, and its shorter side is smaller than the diameter of the tourmaline composite grains so as for them not to pass therethrough. Further, a handle 119 is fixed to the inner tube 114 (tube part 116) for carrying the inner tube easily. The tube part and the bottom of the inner tube 114 may be made of a plastic material as an integral product without using punching metal. The lowest inner tube 114 among the five stacked inner tubes is arranged above the bottom wall 107a of the outer tube 107 on a spacer 120. The spacer 120 is set in order to introduce the raw water received through the inlet 108 in the outer tube 107, into the lowest inner tube 114 uniformly.

The pressure pump (compressor) 104 is put on the top wall 102b of the raw water tank 102, and air pressurized by the pump 104 is introduced through a path 121 into an air portion 122 in the tank 102. When raw water in the tank 102 is supplied to the activated water tower 103, the inlet 106 is closed with a valve (not shown), and the pressurized air is supplied by the pump 104 in the tank 102. Thus, the air pressure in the air portion 122 presses the raw water in the tank 102 toward the activated water tower 103. The air pressure in the air portion 122 is for example 1.5 kg/cm$^2$.

In the tower 103, the raw water introduced from the tank 102 is converted to activated water by contacting with the tourmaline composite grains 115 inside the inner tubes 114. In each inner tube 114, the raw water flows upward. This flow moves the grains 115 vigorously, and the tourmaline composite grains 115 form a fluidized layer in the inner tube 114. Thus, friction contact of water with the grains or friction contact between the grains is accelerated, and the conversion from raw water to activated water is improved.

The mechanism on the conversion of raw water to activated water is repeated briefly here. A part of $H_3O^+$ ions (hydronium ions) produced by ionization of water contacts with a metal or plastic (resin) of the inner tubes 114 and vanishes by losing the positive charge. This action is apparent especially for the plastics as the material of the tube portion 116 of the inner tube 114 because negative charges are generated on the plastic surface by the friction contact with water, and the negative charges neutralize the positive charges of $H_3O^+$ ions to decrease the $H_3O^+$ concentration. Thus, water includes many $OH^-$ ions (or $H_3O_2^-$ ions). Further, when $H_3O^+$ contacts with a iron surface, the iron receives the positive charge to become $Fe^{2+}$ and $Fe^{3+}$ to get rusty, but the resultant FeO and $Fe_2O_3$ are combined to form a coating film of magnetite ($Fe_3O_4$). Thus the $H_3O^+$ is consumed so that iron becomes in the passive state to prevent further corrosion. As explained above, $OH^-$ ions generated by the tourmaline composite grains 115 increase the washing performance of water. As explained above, far infrared rays emitted from the tourmaline composite grains 115 are absorbed by water to divide clusters into relatively small clusters of 7–8 water molecules. Further, as secondary effects, impurities included are sent out, solubility is increased, surface tension is decreased, and vaporization is enhanced. These effects enhance the washing performance of the activated water.

Further, because the binder in the tourmaline composite grains includes a zinc component (Zn), a very small amount of zinc is dissolved in water from the tourmaline composite grains in the activated water tower 103, and the wash water includes the very small amount of zinc. When a structure such as an automobile, a railroad train, an airplane or an outer wall of a building exposed to outdoor environment is washed with the wash water, zinc included in the wash water deposits by a very small amount in very small recesses on the surface of the structure and it becomes zinc oxide ZnO. When ZnO, which is a semiconductor, receives ultraviolet rays in sunlight, the electrical conduction occurs to release the electrostatic charges on the surface or removes them. Thus, the surface becomes hard for dust or the like to adhere thereto.

Further, because tourmaline or the binder in the grains include boron (B), a very small amount of boron is dissolved in water from the tourmaline composite grains in the activated water tower 103, and the wash water includes the very small amount of boron. When a structure is washed with the wash water, boron included in the wash water deposits by a very small amount on the surface of the structure to form a thin coating (coexistence of ZnO). The boron coating protects the surface of the structure, and increases the luster of the surface. Thus, the luster or the beauty of the structure is improved.

As explained above, raw water is converted to activated water in the activated water tower 103, and the activated water is supplied from the tower 103 as wash water. By using the activated water as wash water, various structures such as an automobile or an outer wall of a building can be washed effectively without using a detergent.

Various advantages are observed when the wash water is used.

(a) A detergent or a drug for washing is not needed. washing is performed only with a physical technique such as brushing. Therefore, the surface of a structure is not changed in quality nor is it deteriorated, and the water does not become dirty. Washer's hands are not harmed.

Further, washing operation becomes simple, and washing cost is decreased.

(b) Green moss or the like does not grow on the surface of a structure after washing.

(c) Electrostatic charges on the surface of a structure are removed by zinc oxide deposited on the structure, and dirt or the like becomes harder to adhere to the surface.

(d) The luster of the surface of a structure becomes better by boron deposition on the surface, and waxing is not necessary.

Table 2 shows an example of water compositions in the units of mg/liter of raw water (well water in this example) and activated water obtained from the raw water.

TABLE 2

Composition of well water and washing water (activated water)

| Component (mg/liter) | Activated water | Well water |
| --- | --- | --- |
| Zn | 0.11 | 0.005 |
| B | 0.34 | 0.02 |
| Na | 11 | 10 |
| K | 4.9 | 4.9 |
| Mg | 9.1 | 9.1 |
| Ca | 0.88 | 0.94 |
| $SiO_2$ | 20 | 20 |
| Mn | 0.08 | 0.12 |
| Cl | 6.8 | 6.8 |
| $NO_3$ | 0.23 | 0.15 |
| $SO_4$ | 6.1 | 6.2 |

Figure 17:
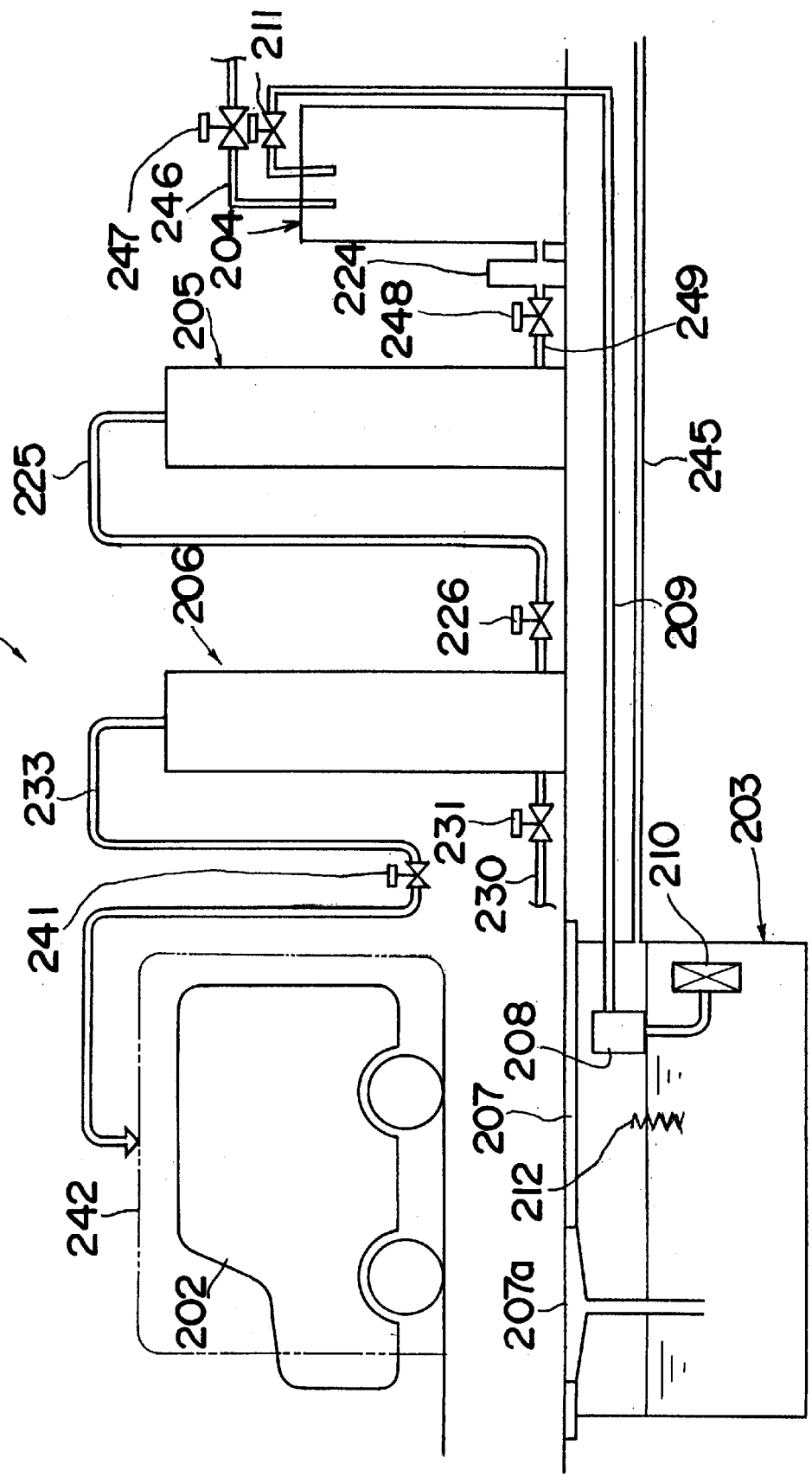
FIG. 17 is a schematic diagram of an apparatus for washing a motor vehicle.

As mentioned above, various structures such as a motor vehicle or an outer wall of a building can be washed effectively with the activated water, without using a detergent. Further, water can be recycled for washing. As an example, FIG. 17 shows an apparatus 201 for a motor vehicle 202 which supplies wash water by recycling. The object to be washed is not limited to the motor vehicle.

The apparatus 201 has a waste water reservoir 203 which stores waste water after washing a motor vehicle 202 such as an automobile, a water tank 204 which controls the concentrations of dirt contents included in the waste water introduced from the waste water reservoir 203 at a constant level, a second tower 205 which decomposes organic substances in the water received from the water tank 204 to purify the water, and a first tower or an activated water tower 206 which converts the water purified by the second tower 205 to activated water (rich in OH⁻ ions and including relatively small water clusters) by the tourmaline composite grains and supplied the activated water. The water tank 204 and the second tower 205 are provided for preprocessing the waste water supplied for the waste water reservoir 203 before supplying it to the first tower 206 for activating the waste water.

The waste water reservoir 203 is a water reservoir made of concrete and built underground. The waste water reservoir 203 has a top cover 207 which closes the top end thereof, and the top cover has a member 207a for collecting waste water after washing. A first pump 208 sends the waste water in the tank 203 through a supply pipe 209 to the water tank 204 for controlling concentration. A filter 210 is provided at an inlet end of the first pump 209 and it removes dirts such as solid substances and oil floating in the waste water. A valve 211 is provided at an outlet end of the supply pipe 209 for opening and closing the pipe. Further, a fence 212 is set in the reservoir 203 near the inlet end of the first pump 208 or the filter 210 in order to remove oil floating in the water. A discharge path 245 is provided to discharge the waste water in the reservoir 203 to the exterior of the system.

The waste water tank 204 for controlling the concentration has a supplier 246 for supplying virgin water (such as tap water or well water) into the water tank 204. According to the concentration of the impurities included in the waste water in the water tank 204, a valve 247 is opened or closed to add virgin water to the waste water. An outlet is provided at the lower portion of the water tank 204, and the waste water, after controlling the concentration, is introduced by a second pump 224 through a path 249 with a valve 248 to the second tower 205 for decomposing organic substances.

Figure 18:
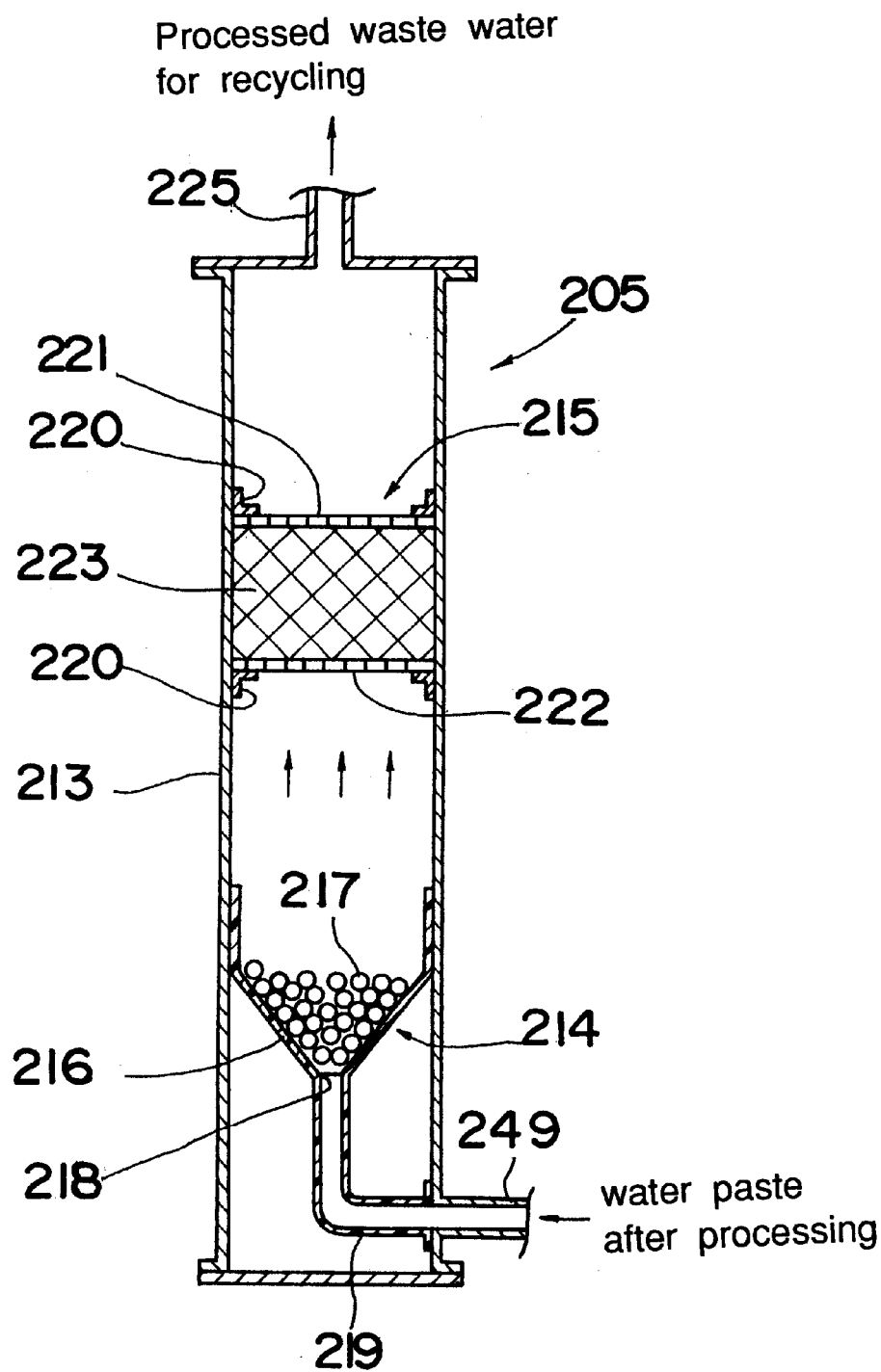
FIG. 18 is a sectional front view of a tower for decomposing organic substances in the apparatus for washing a motor vehicle.

As shown in FIG. 18, the second tower 205 has an outer tube 213 having the shape hollow cylinder and made of steel plate. The outer tube 213 contains a radiation processor 214 at the lower part and a biological processor 215 at the upper part. It is desirable that the distance between the two processors 214 and 215 be separated as far as possible. The radiation processor 214 has a tray 216 made of a plastic material, and the tray 216 has a tapered section extending upward and a cylindrical section contained closely to the outer tube 213. The tray 216 contains many grains 217 which include very fine natural radiator substances combined with a binder. The natural radiator substance is for example a rare earth mineral which generates radiations naturally. The grains 217 are hereafter referred to as natural radiation source composite grains. The materials of the outer tube 213 and the tray 216 are not limited to the above ones. For example, the outer tube 213 may be made of a plastic material, or the tray 216 may be made of a metal. The form of the radiation processor 214 is not limited to the above one, and the inner tubes 114 for holding tourmaline composite grains as explained above may be used therefor.

The second or organic substance decomposition tower 205 has an inlet 218 at its lower side for introducing the waste water after concentration control, and the inlet 218 is connected through an L-shaped pipe 219 to the downstream side of the path 249. Therefore, the waste water after concentration control in the water tank 204 is introduced through the path 249 and the pipe 219 to the radiation processor 214, and it flows upward in the tray 216 to contact with the natural radiation source composite grains 217. Thus, the grains 217 are fluidized vigorously by the upward flow of the waste water to accelerate the contact thereof with the waste water. Thus, the decomposition of the organic substances in the waste water is accelerated.

In the radiation processor 214, OH⁻ ions and OH radicals are produced from water molecules in the waste water by radiations ($\alpha$, $\beta$, $\gamma$ rays) radiated from the natural radiator substances in the natural radiation source composite grains 217, and they decompose organic substances (oil, fat, protein and the like). Further, far infrared rays radiated from the grains 217 divide water clusters in the water, and organic substances contained in the clusters therein are let out, and this also accelerates the decomposition of organic materials by the radiations.

The biological processor 215 mounted above the radiation processor 214 has an upper porous plate 221, a lower porous plate 222 and a biological filter 223 between them. The porous plates 211 and 222 are fixed to the outer tube 213 with brackets 220. The biological filter 223 comprises a honeycomb or fibrous base made of a plastic material or the like and a microorganism film on the base. The microorganism film includes many aerobic bacteria. The waste water processed by the radiation processor 214 to decompose organic substances rises in the outer tube 213 to pass through the biological processor 215. The organic substances which have not been decomposed by the radiation processor 214 are decomposed by the aerobic bacteria biologically when they pass through the biological processor 223.

The waste water purified by the radiation and biological processors 214, 215 by decomposing organic substances is supplied through a supply path 225 to the first or activated water tower 206. A valve 226 is provided at an outlet side of the supply path 225 for opening or closing the path 225.

As shown in FIG. 19, the first tower 206 has a similar structure to the activated water tower 103 shown in FIG. 14.

The first tower 206 has an outer hollow cylindrical tube 227 made of steel plates. A first inlet 228 provided at the lower side of the outer tube 227a is connected to the down stream end of the supply path 225 to introduce waste water from the second tower 205. Further, at a second inlet 229 provided at the lower side of the outer tube 227a is connected to another supply path 230 for introducing tap water as virgin water, and a valve 231 is provided to open or close the supply path 230. Thus, tap water can be introduced into the first tower 206. Underground water or well water may be used as virgin water instead of tap water. Further, an outlet 232 is provided at a top wall 227b covering the outer tube 227 to send the activated water, and a hose 233 is connected to the outlet 232 for supplying the activated water.

Inside the outer tube 227, five inner tubes hollow cylindrical tube 234 are stacked in multi-stages. Many tourmaline composite grains 235 having shapes of beads or balls are contained inside the inner tubes 234. The grains 235 are made of fine tourmaline powders combined with a glass binder as explained above. The functions of the grains are explained above, and the explanation thereof is omitted here. The inner tubes 234 are similar to the inner tubes 114 shown in FIGS. 15 and 16. The water introduced into the first tower 206 is activated as explained above on the activated water tower 103, and the detailed explanation is omitted here.

The waste water supplied from the second tower 205 or tap water is converted to activated water in the first tower 206, and the activated water is used as wash water. That is, when an automobile 202 is washed by a washing machine 242, a valve 241 provided in the hose 233 is opened, and the automobile 202 is washed by the washing machine 242 with the wash water (activated water) supplied from the first tower 206. The washing machine 242 washes the automobile with water by using a physical means, without using a detergent. In this example, the washing machine 242 washes the automobile with brushing. The blast pressure of the wash water depends on the discharge pressure of the second pump 224 or the supply pressure of tap water. When the automobile 202 is subjected for final washing, it is desirable to introduce tap water to the first tank 206 in order to supply wash water having high washing performance.

An analysis of the activated water which have been purified and converted as explained above shows that it is perfectly transparent, and the remains after evaporation is 87 mg/liter. The activated water includes calcium, magnesium, sodium and silica somewhat, but it does not include iron. The analysis result means that the wash water has similar water quality as tap water as far as the above components are concerned.

Washing effect is compared in a gate-type washing machine for motor vehicle. An automobile is washed with (a) brushing and waxing using underground water, (b) brushing using the activated water and (c) brushing using underground water. Table 3 summarizes the results. The luster of the automobile after washing is measured with a luster meter (Minolta GM-60). It is apparent that the brushing using the activated water according to the embodiment of the invention is far superior than the prior art brushing with underground water and has a similar effect as the prior art washing with brushing and waxing.

TABLE 3

Luster of automobiles after washing

| Washing process | Luster |
|---|---|
| Underground water + brushing and waxing | 170 |
| Activated water + brushing | 165 |
| Underground water + brushing | 123 |

NB: Luster is measured with Minolta GM-60.

The washing of automobile with the above-mentioned apparatus 201 has the following advantages.

Because the waste water after washing is recycled by decomposing organic substances, consumption of water for washing moving vehicles is decreased to a large extent, and the water resources can be saved.

Because the activated water obtained by activating waste water after washing has a similar washing performance as a detergent, it is not necessary to use a detergent, and a moving vehicle can be washed efficiently only with a physical means such as brushing with water. Therefore, even if washing is repeated, the coating on the surface of the body of a moving vehicle is not changed in quality or is not deteriorated, and the water does not become dirty. Washer's hands are not harmed. Further, washing operation becomes simple, and washing cost is decreased. Because no microorganisms grow in the activated water, green moss or the like does not grow on the surface of the body. Further, as explained above, zinc included in the binder prevents adhesion of dirts on the surface of the body, and boron included in tourmaline and the binder protects the surface of the body. Because the film including boron enhances luster of the surface, the luster or the beauty of the body becomes good even without waxing.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A tourmaline composite grains comprising:
    a glass matrix; and
    powders of tourmaline dispersed therein in an amount equal to or larger than 30% by weight.

2. The tourmaline composite grains according to claim 1, wherein said glass matrix is made of glass having melting point between 500° C. and transition temperature of tourmaline.

3. The tourmaline composite grains according to claim 2, wherein said glass matrix comprises a glass component having far infrared emissivity higher than tourmaline.

4. A method for producing tourmaline composite grains comprising the steps of:
    pulverizing tourmaline to provide powders thereof;
    mixing the tourmaline fine powders with glass powders having melting point between 500° C. and transition temperature of tourmaline to provide a mixture;
    forming the mixture into grains; and
    sintering the grains at a temperature below melting point of the glass powders.

5. The method according to claim 4, wherein the grains are sintered in a temperature between 450 and 800° C.

6. The tourmaline composite grains according to claim 1, wherein the weight ratio of the tourmaline powders is equal to or smaller than 70%.

* * * * *